United States Patent
Varadarajan et al.

(10) Patent No.: US 9,276,638 B2
(45) Date of Patent: Mar. 1, 2016

(54) COUPLING CIRCUITS FOR POWER LINE COMMUNICATION DEVICES

(75) Inventors: Badri Varadarajan, Mountain View, CA (US); Edward Mullins, Sahuarita, AZ (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1127 days.

(21) Appl. No.: 13/229,041

(22) Filed: Sep. 9, 2011

(65) Prior Publication Data

US 2012/0068784 A1 Mar. 22, 2012

Related U.S. Application Data

(60) Provisional application No. 61/385,339, filed on Sep. 22, 2010.

(51) Int. Cl.
*H01P 1/10* (2006.01)
*H04B 3/56* (2006.01)

(52) U.S. Cl.
CPC ........................................ *H04B 3/56* (2013.01)

(58) Field of Classification Search
USPC .......................................................... 333/101
See application file for complete search history.

(56) References Cited

U.S. PATENT DOCUMENTS

2006/0165054 A1 7/2006 Iwamura
2011/0200076 A1* 8/2011 Mu et al. ........................ 375/219

* cited by examiner

*Primary Examiner* — Jared Fureman
*Assistant Examiner* — Aqeel Bukhari
(74) *Attorney, Agent, or Firm* — Steven A. Shaw; Frank D. Cimino (57) ABSTRACT

Coupling circuits for power line communication (PLC) devices are described. In an embodiment, a PLC device may comprise a processor and a coupling circuit coupled to the processor. The coupling circuit may in turn comprise a transmitter path and a receiver path. In some implementations, the transmitter path may include a first amplifier, a first capacitor coupled to the first amplifier, a first transformer coupled to the first capacitor, and a plurality of line interface coupling circuits coupled to the first transformer, where each of the line interface coupling circuits is configured to be connected to a different phase of an electrical power circuit. Meanwhile, the receiver path may include a plurality of capacitors, where each of the plurality of capacitors coupled to a corresponding one of the line interface circuits, a filter network coupled to the plurality of capacitors, and a second amplifier coupled to the filter network.

20 Claims, 5 Drawing Sheets

COUPLING CIRCUITS FOR POWER LINE COMMUNICATION DEVICES

CROSS-REFERENCE TO RELATED APPLICATIONS

This application claims the benefit of the filing date of U.S. Provisional Patent Application No. 61/385,339, which is titled "Three-Phase Line Coupling Circuits for Powerline Communication Modems" and was filed Sep. 22, 2010, the disclosure of which is hereby incorporated by reference herein in its entirety.

TECHNICAL FIELD

Embodiments are directed, in general, to power line communications, and, more specifically, to coupling circuits for power line communication (PLC) devices.

BACKGROUND

Power line communications include systems for communicating data over the same medium (i.e., a wire or conductor) that is also used to transmit electric power to residences, buildings, factories, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, and ITU-T G.hn (e.g., G.9960 and G.9961) specifications.

SUMMARY

Coupling circuits for power line communication (PLC) devices are described. Examples of PLC devices suitable for utilizing the various circuits and techniques described herein include PLC modems, appliances, meters, gateways, data concentrators, and the like. In some embodiments, a PLC device may include a processor and a coupling circuit coupled to the processor. For example, the processor may include a digital signal processor (DSP), an application specific integrated circuit (ASIC), a system-on-chip (SoC) circuit, a field-programmable gate array (FPGA), a microprocessor, or a microcontroller. Moreover, the coupling circuit may comprise a transmitter path and a receiver path.

In certain implementations, the transmitter path may include a first amplifier, a first capacitor coupled to the first amplifier, a first transformer coupled to the first capacitor, and a plurality of line interface coupling circuits coupled to the first transformer. Each of the line interface coupling circuits may be configured to be connected to a different phase of an electrical power circuit. Meanwhile, the receiver path may include a plurality of capacitors, a filter network coupled to the plurality of capacitors, and a second amplifier coupled to the filter network. Each of the plurality of capacitors may be coupled to a corresponding one of the line interface circuits. Also, the filter network may include a second transformer.

In the transmitter path, the first amplifier may be configured to operate in a low impedance mode during a transmission operation and in a high impedance mode during a receiving operation. In the receiver path, the plurality of capacitors may be configured to linearly combine signals received through the plurality of line interface coupling circuits.

Each of the plurality of line interface coupling circuits may be configured as a high-pass filter, and the filter network may be configured as a band-pass filter. In some cases, the band-pass filter may be dynamically adjustable to select a frequency band corresponding to a frequency selected in response to an indication that the circuit is configured to operate in one of a plurality of different receiving modes.

In certain implementations, the coupling circuit may also comprise a plurality of high-voltage switches, where each of the plurality of high-voltage switches is coupled between the first transformer and a corresponding one of the plurality of line interface coupling circuits. The plurality of high-voltage switches may be configured such that, in response to an indication that the circuit is operating in a particular transmitting mode, at least one of the plurality of high-voltage switches is open. For example, the number of high-voltage switches that may be open or closed during transmission may depend upon whether the PLC device is operating in a broadcast, multicast, or unicast transmission mode.

Additionally or alternatively, the plurality of high-voltage switches may be configured such that, in response to an indication that the circuit is configured to operate in a particular receiving mode, one or more of the plurality of high-voltage switches may be closed. Again, the number of high-voltage switches that may be open or closed during reception may depend upon whether the PLC device is expecting to receive signals in a broadcast, multicast, or unicast mode. For example, if the device is set to receive signals in broadcast mode (or in a unicast mode through a known phase), a single one of high-voltage switches may be closed, thus further increasing the impedance of the receive path.

BRIEF DESCRIPTION OF THE DRAWINGS

Having thus described the invention(s) in general terms, reference will now be made to the accompanying drawings, wherein:

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Figure 1:
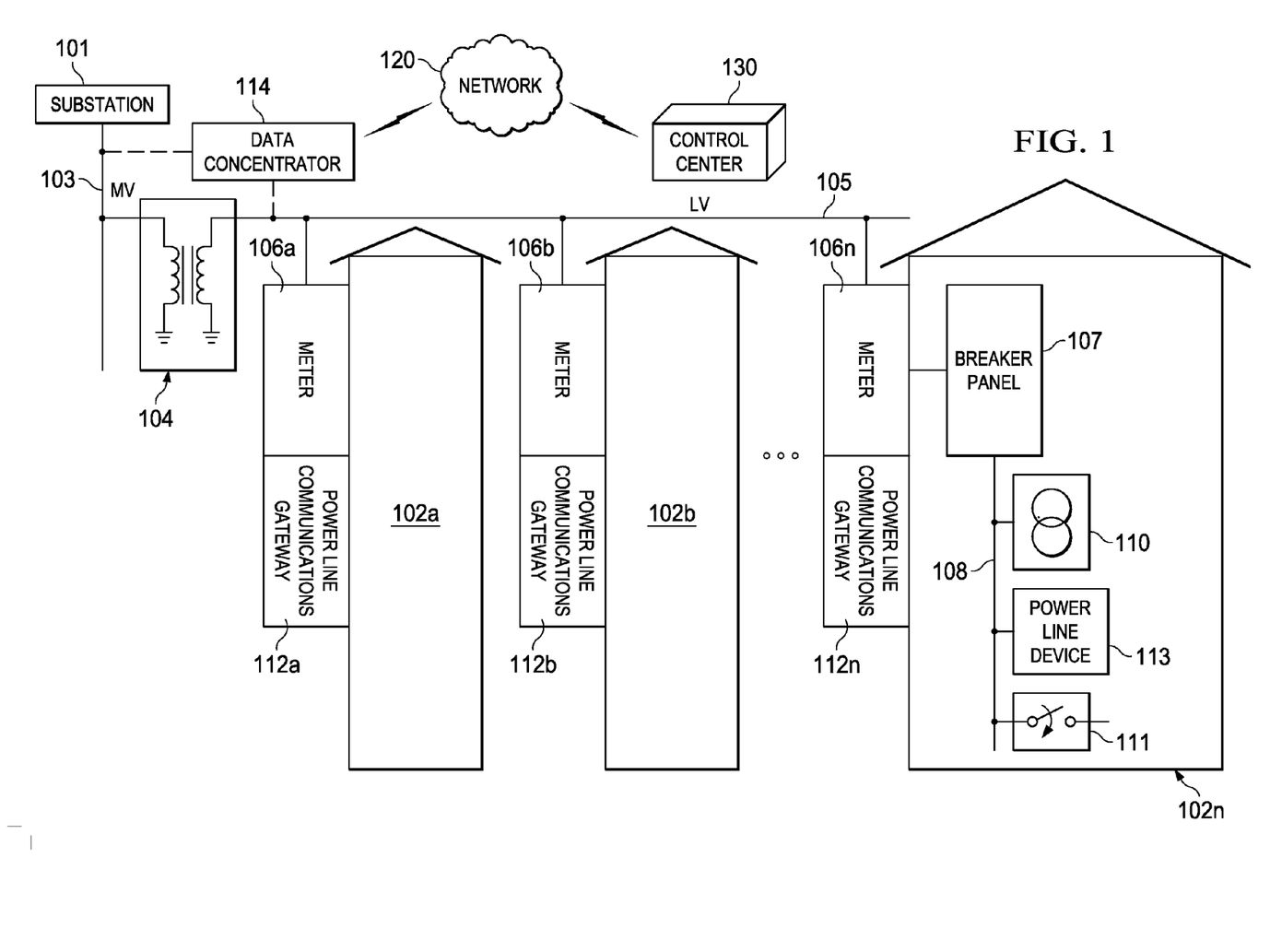
FIG. 1 is a diagram of a PLC environment according to some embodiments.

Turning to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not generally allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility, or other location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used, for example, to deliver high-speed communications to residences 102a-n. In some implementations, power line communications modems or gateways 112a-n may be coupled to LV power lines 105 at meter 106a-n. PLC modems or gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at premises 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrow-band control applications, low bandwidth data collection applications, or the like. In a home environment, for example, modems or gateways 112a-n may further enable home and building automation in heat and air conditioning, lighting, and security. Also, PLC modems or gateways 112a-n may enable alternating current (AC) or direct current (DC) charging of electric vehicles and other appliances. An example of an AC or DC charger is illustrated as PLC device 113. Outside the premises, power line communication networks may provide street lighting control and remote power meter data collection.

One or more concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

Figure 2:
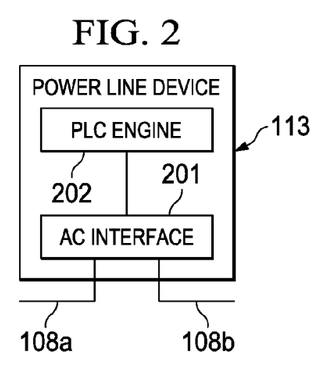
FIG. 2 is a block diagram of a PLC device or modem according to some embodiments.

FIG. 2 is a block diagram of PLC device 113 according to some embodiments. As illustrated, AC interface 201 may be coupled to electrical wires 108a and 108b (e.g., phase and neutral) inside of premises 112n in a manner that allows PLC device 113 to switch the connection between wires 108a and 108b off using a switching circuit or the like. In other embodiments, however, AC interface 201 may be connected to a single wire 108 (i.e., phase only) and without providing such switching capabilities. In operation, AC interface 201 includes a coupling circuit that allows PLC engine 202 to receive and transmit PLC signals over wires 108a-b. Embodiments of coupling circuits suitable for use as part of AC interface 201 are disclosed below with respect to FIGS. 6 and 7.

In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to generate OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateway 112n, data concentrator 114, etc.) for further processing. Conversely, PLC engine 202 may receive instructions and/or other information from such higher-level PLC devices encoded in PLC signals, for example, to allow PLC engine 202 to select a particular frequency band in which to operate. In various embodiments, the frequency band in which PLC device 113 operates may be selected or otherwise allocated based, at least in part, upon an application profile and/or a device class associated with PLC device 113.

Figure 3:
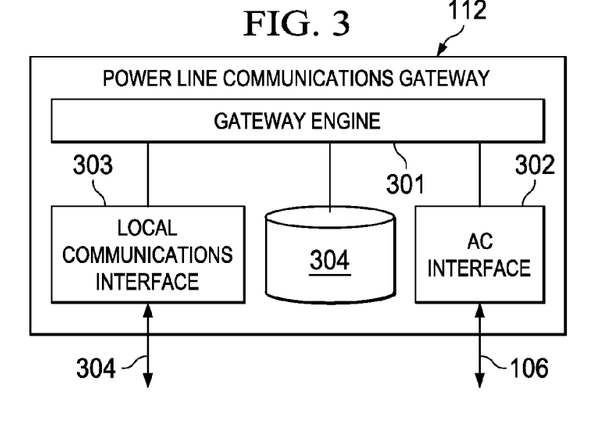
FIG. 3 is a block diagram of a PLC gateway according to some embodiments.

FIG. 3 is a block diagram of PLC gateway 112 according to some embodiments. As illustrated in this example, gateway engine 301 is coupled to AC interface 302, local communication interface 304, and frequency band usage database 304. In the illustrated embodiments, AC interface 302 is coupled to meter 106, and local communication interface 304 is coupled to one or more of a variety of PLC devices such as, for example, PLC device 113. Similarly as AC interface 201, here AC interface 302 may also include coupling circuits that facilitate the transmission and reception of PLC signals over one or more power line(s). Local communication interface 304 may provide a variety of communication protocols such as, for example, ZigBee®, Bluetooth®, WiFi, WiMax, Ethernet, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

Figure 4:
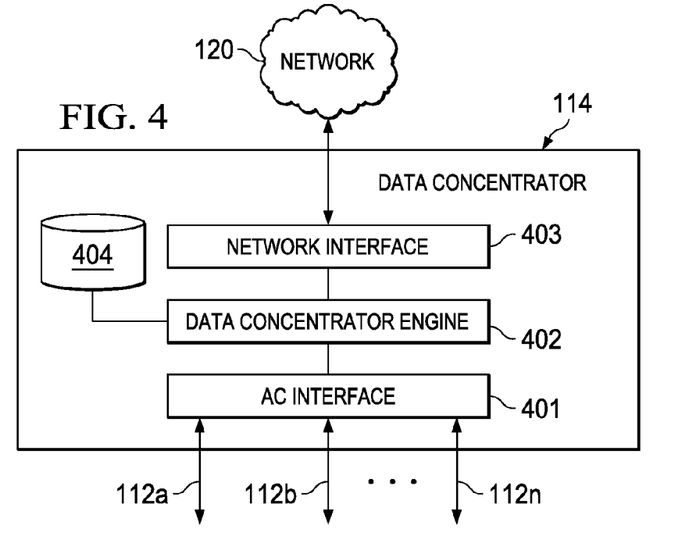
FIG. 4 is a block diagram of a PLC data concentrator according to some embodiments.

FIG. 4 is a block diagram of a PLC data concentrator according to some embodiments. AC interface 401 (e.g., similar to interfaces 201 and 302) is coupled to data concentrator engine 402 and may be configured to communicate with one or more PLC gateways or devices 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, frequency usage database 404 may be configured to store records similar to those described above with respect to database 304.

In some cases, one or more of blocks within the PLC devices shown in FIGS. 2-4 may be implemented as an integrated circuit or the like. For instance, with respect to FIG. 4, in some embodiments data concentrator engine 402 and network interface 403 may be implemented an integrated circuit. In some cases, an integrated circuit may be a digital signal processor (DSP), an application specific integrated circuit (ASIC), a system-on-chip (SoC) circuit, a field-programmable gate array (FPGA), a microprocessor, a microcontroller, or the like. The integrated circuit may be coupled to a memory used to store and/or maintain databases 304 and/or 404 shown in FIGS. 3 and 4. Further, the integrated circuit may include a driver for communicating signals to its memory. A power supply may also be provided to supply a DC supply voltage to the integrated circuit as well to the memory. The memory may include any suitable type of memory, including, for example, static random-access memory (SRAM), nonvolatile RAM (NVRAM, such as "flash" memory), and/or dynamic RAM (DRAM) such as synchronous DRAM (SDRAM), double data rate (DDR, DDR2, DDR3, etc.) SDRAM, Rambus® DRAM, etc.

Generally speaking, each of the devices shown in FIGS. 2-4 may have similar PLC modem capabilities in order to be able to transmit and/or receive PLC signals over one or more power lines. As previously noted, AC interfaces 201, 302, and 402 may each include one or more coupling circuits, which are described in detail below with respect to FIGS. 6 and 7. In a case where the PLC device is a PLC modem, the coupling circuit within these AC interfaces may be connectable to a single phase of the electric grid (e.g., wire 108 in FIG. 1). In other cases, however, the PLC device may be coupled to a dual or triple-phase circuit (e.g., in an industrial facility). Accordingly, certain PLC devices (e.g., data concentrator 114) may be coupled to any number of phases (e.g., each corresponding to an LV wire 105 feeding a particular premises 102a-n). In the examples that follow, a three-phase scenario is assumed for sake of illustration only, although it should be understood that the invention(s) described herein are not so limited.

Figure 5:
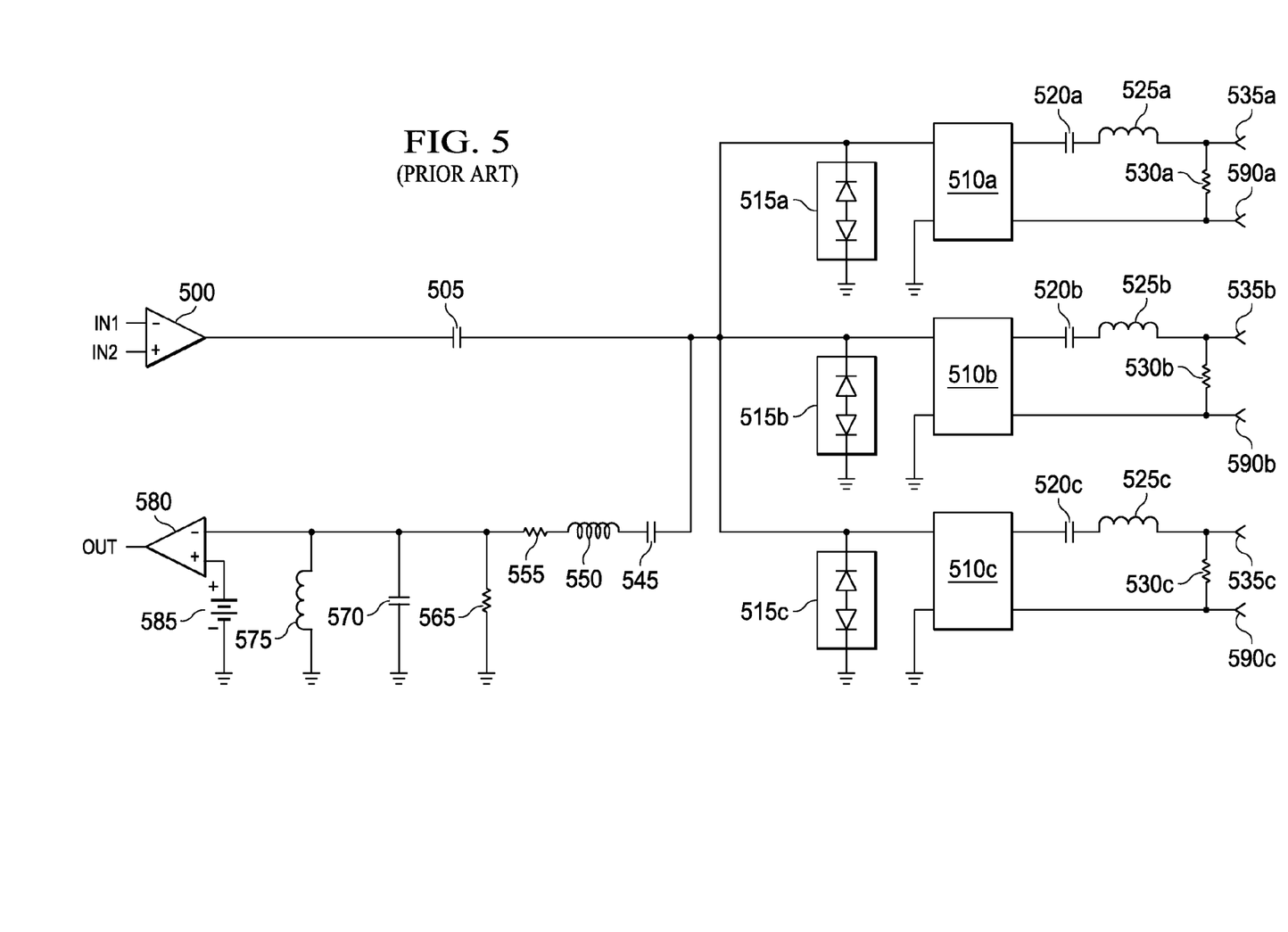
FIG. 5 is a block diagram of a prior art PLC coupling circuit.

Turning to FIG. 5, a block diagram of a prior art PLC coupling circuit is depicted. As illustrated, the diagram of FIG. 5 shows a conventional approach to designing, for example, a coupling circuit typically used in AC interface circuit 401 of data concentrator 114 shown in FIG. 4. As shown, a transmitting path includes amplifier 500 and capacitor 505, before splitting into three sub-circuits, one for each of three phases. The three sub-circuits include transformers 510a-c, transient voltage suppressors 515a-c, capacitors 520a-c, inductors 525a-c, and resistors 530a-c. In FIG. 5, the subscript "a" indicates first phase 535a/590a, "b" indicates second phase 535b/590b, and "c" indicates third phase 535c/590c. Thus, the transmit path includes one transformer for each phase. In each respective phase, capacitors 520a-c, inductors 525a-c, and resistors 530a-c may be generally referred to as line interface coupling circuits, and create high-pass filters that attempt to eliminate or at least reduce interference from the AC frequency of the power grid (i.e., approximately 50 or 60 Hz).

In the receiving path, another capacitor 545 is coupled to the node between capacitor 505 and transformers 510a-c. The remainder of the receiving path includes inductor 550, resistors 555 and 565, capacitor 570, inductor 575, DC power source 585, and amplifier 580. Moreover, inductor 550, resistors 555 and 565, capacitor 570, and inductor 575 form a band-pass filter that aims to filter out signals outside the frequency band in which the PLC device is designed to operate.

The coupling circuit depicted in FIG. 5 generally works for its intended purposes—i.e., to couple PLC device to one or more electrical power wires. Nonetheless, the inventors hereof have recognized that the circuit shown in FIG. 5 includes three transformers 510a-c, which occupy a significant amount of physical space on the printed circuit board (PCB) where these components are typically placed. In address this issue, the inventors have also recognized a need to maintain the coupling circuit's impedance small during a transmission mode, and high during a receiving mode. As such, FIGS. 6 and 7 depict PLC coupling circuits according to some embodiments.

Figure 6:
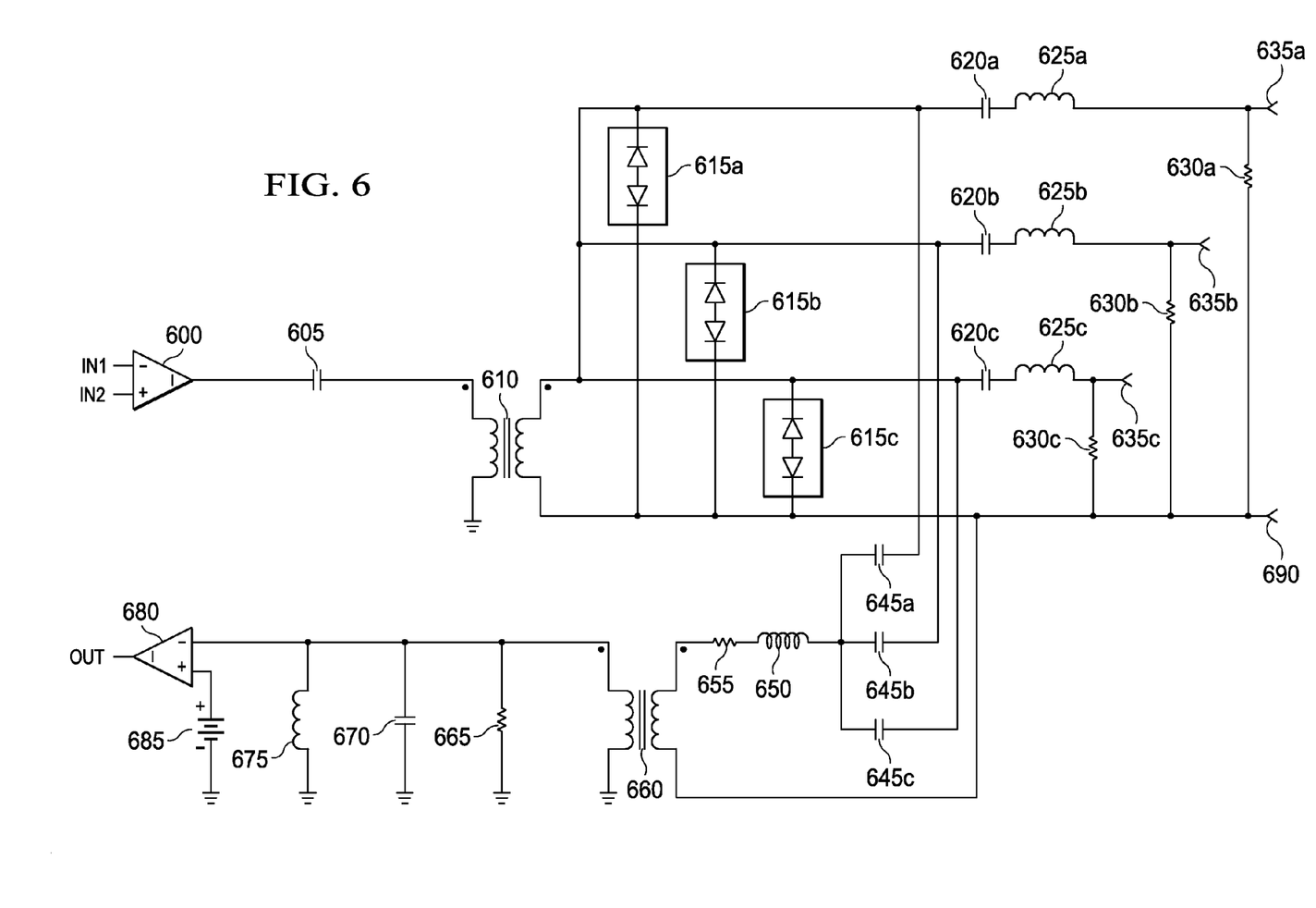
FIG. 6 is a block diagram of a PLC coupling circuit according to some embodiments.
Figure 7:
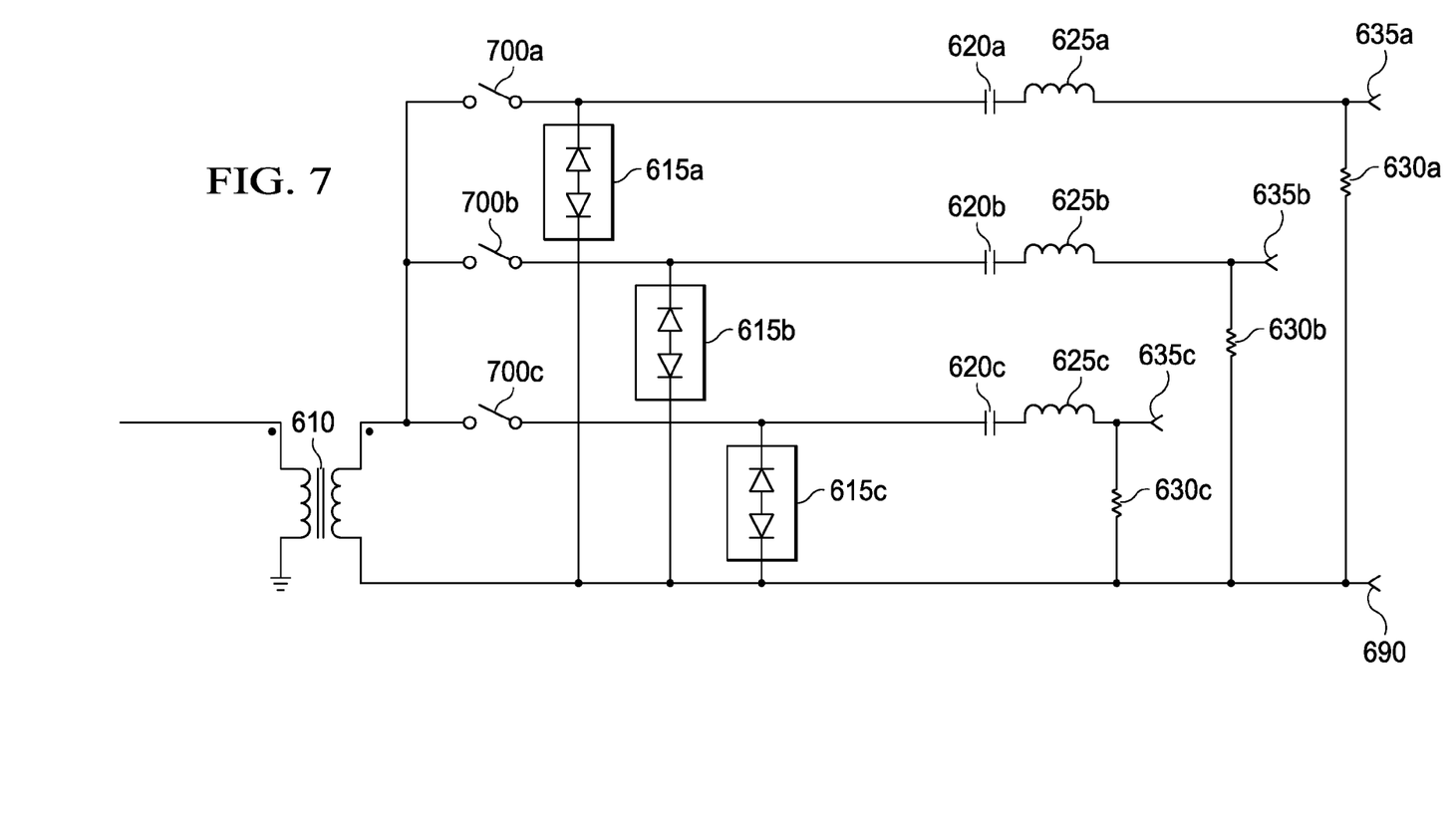
FIG. 7 is a block diagram of a PLC coupling circuit implemented with high-voltage switches according to some embodiments.

In FIG. 6, the transmit path of a coupling circuit includes first amplifier 600, first capacitor 605, and first transformer 610 before splitting into three sub-circuits, one for each of three phases. Particularly, a single shared transformer 610 may be used for all three phases. In each sub-circuit, transient voltage suppressors 615a-c are coupled to a corresponding line interface coupling circuit, these line interface coupling circuits including capacitors 620a-c, inductors 625a-c, and resistors 630a-c. In this case, first phase 635a, second phase 635b, and third phase 635c are each referenced with respect to a same neutral wire 690. Also, in each respective phase, capacitors 620a-c, inductors 625a-c, and resistors 630a-c may implement high-pass filters configured to reduce interference from the AC frequency of the power grid (i.e., approximately 50 or 60 Hz). It should be noted that, generally speaking, any number of PLC devices, modems, meters, appliances, etc. may be coupled to any of phases 635a-c.

As shown, in the receive path, each of three capacitors 645a-c is coupled to a respective line interface coupling circuit for each phase. These three capacitors 645a-c are coupled to inductor 650, which is coupled to resistor 655, and which in turn is coupled to second transformer 660. Second transformer 660 is coupled to resistor 665, capacitor 670, and inductor 675. Inductor 675 and DC power source 685 are coupled to the inputs of second amplifier 680, which is configured to output the received PLC signals. Here, capacitors 645a-c, inductor 650, resistor 655, transformer 660, resistor 665, capacitor 670, and inductor 675 from a filter network that implements a band-pass filter.

In some embodiments, a PLC device may operate in either a transmitting mode or in receiving mode at a given time. Accordingly, transmitting amplifier 600 may be disabled into a high-impedance state during receiving mode. Also during reception of PLC signals, capacitors 645a-c may linearly combine all signals in each of the three phases, and sum those signals together coming in through the high-impedance network of the receiver side or path. In some cases, the value of each of a capacitors 645a-c may be a third of the value of capacitor 545 in FIG. 5. More generally, the value of each such capacitor may be 1/n of the value of a single capacitor shown in FIG. 5, where n is the number of phases in the transmit side or path.

In some embodiments, the band-pass filter in the receiver path may be dynamically adjustable or configurable to select a frequency band corresponding to a particular frequency of operation of the PLC device. For example, the PLC device, upon powering up in the PLC network, may be assigned a particular frequency of operation, including, for example, a specific frequency (or range of frequencies) at which it may expect to receive PLC communication signals. In response to determining its frequenc(ies) of operation, the adjustable band-pass filter may be configured to allow the selected frequenc(ies) to reach amplifier 680.

It may be noted that, in contrast with the circuit shown in FIG. 5, the coupling circuit of FIG. 6 uses a single transformer in its transmit path, thus occupying a smaller footprint in a PCB within the PLC device. Furthermore, in various implementations, transformer 660 in the receive path may be physically smaller than transformer 610, thus providing additional space savings.

FIG. 7 shows the transmit side of the circuit shown in FIG. 6 with certain modifications. Specifically, the coupling circuit includes a plurality of high-voltage switches 700a-c, each of switches 700a-c coupled between transformer 610 and a corresponding one of the plurality of line interface coupling circuits in phases 635a-c. In some embodiments, high-voltage switches 700a-c may be configured such that, in response to an indication that the circuit is operating in a particular transmitting mode, at least one of high-voltage switches (e.g., 700a) is open. Examples of transmitting modes may include a broadcasting mode (e.g., transmission of a PLC signal through all phases of the grid), a multicasting mode (e.g., transmission of a PLC signal through a subset of all phases of the grid and/or to a specific group of PLC devices in the PLC network), and/or a unicasting mode (e.g., transmission of a PLC signal through a single phase and/or to a specifically addressed PLC device).

For instance, in some implementations, if the circuit is operating in broadcast mode, all of high-voltage switches 700a-c may be closed so that the PLC signal transmitted by the PLC device may reach all of phases 635a-c. If, on the other hand, the circuit is operating in multicast mode, one or two (but not all three) of high-voltage switches 700a-c may be closed so that the PLC signal may be transmitted through the relevant phases. Moreover, if the circuit is operating in unicast mode, a single one of high-voltage switches 700a-c may be closed so that the PLC signal may be transmitted through a single phase. In this manner, the impedance of the coupling circuit may be further controlled during a transmission operation.

Additionally or alternatively, high-voltage switches 700a-c may be configured in response to an indication that the circuit is operating in a particular receiving mode. Again, the number of high-voltage switches that may be open or closed during reception may depend upon whether the PLC device is expecting to receive signals in a broadcast, multicast, or unicast modes. In this case, however, if the PLC device is set to expect to receive a PLC signal through all of its phases (e.g., in broadcast mode), only one 700a-c may be closed, thus further increasing the impedance of the receive path. (In other embodiments, however, all switches 700a-c may be closed.) If the device expects to receive the PLC signal through a particular subgroup of phases (e.g., in multicast mode), only those among switches 700a-c corresponding to the device's expectations may be closed, and if the device is configured to receive the PLC signal through a single phase (e.g., in unicast mode), only the relevant one among switches 700a-c may be closed. As such the impedance of the coupling circuit may be also be controlled during a reception operation.

In various embodiments, the modules shown in FIGS. 2-4 may represent sets of software routines, logic functions, and/or data structures that are configured to perform specified operations. Although these modules may be distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A power line communication (PLC) device comprising:
a processor; and
a coupling circuit coupled to the processor, the coupling circuit comprising:
a transmitter path including:
a first amplifier;
a first capacitor coupled to the first amplifier;
a shared transformer coupled to the first capacitor; and
a plurality of line interface coupling circuits coupled to the shared transformer, each of the plurality of line interface coupling circuits configured to be connected to a different phase of an electrical power circuit; and
a receiver path including:
a plurality of capacitors, each of the plurality of capacitors coupled to a corresponding one of the plurality of line interface circuits;
a filter network coupled to the plurality of capacitors, the filter network including a second transformer; and
a second amplifier coupled to the filter network.

2. The PLC device of claim 1, wherein the processor includes a digital signal processor (DSP), an application specific integrated circuit (ASIC), a system-on-chip (SoC) circuit, a field-programmable gate array (FPGA), a microprocessor, or a microcontroller.

3. The PLC device of claim 1, wherein each of the plurality of line interface coupling circuits is configured as a high-pass filter.

4. The PLC device of claim 1, wherein the plurality of capacitors is configured to linearly combine signals received through the plurality of line interface coupling circuits.

5. The PLC device of claim 1, wherein the first amplifier is configured to operate in a low impedance mode during a transmission operation and in a high impedance mode during a receiving operation.

6. The PLC device of claim 1, wherein the filter network is configured as a band-pass filter.

7. The PLC device of claim 6, wherein the band-pass filter is configured to be dynamically adjustable to select a frequency band corresponding to a selected frequency of operation.

8. The PLC device of claim 1, further comprising a plurality of high-voltage switches, each of the plurality of high-voltage switches coupled between the shared transformer and a corresponding one of the plurality of line interface coupling circuits.

9. A circuit comprising:
a transmitter including:
a first amplifier;
a first capacitor coupled to the first amplifier;
a shared transformer coupled to the first capacitor; and
a plurality of line interface coupling circuits coupled to the first transformer, each of the plurality of line interface coupling circuits connectable to a different phase of an electrical power circuit; and
a receiver including:
a plurality of capacitors, each of the plurality of capacitors coupled to a corresponding one of the plurality of line interface circuits;
a filter network coupled to the plurality of capacitors; and
a second amplifier coupled to the filter network.

10. The circuit of claim 9, wherein each of the plurality of line interface coupling circuits includes a high-pass filter.

11. The circuit of claim 9, wherein the plurality of capacitors is configured to linearly combine signals received through the plurality of line interface coupling circuits.

12. The circuit of claim 9, wherein the first amplifier is configured to operate in a low impedance mode during a transmission operation and in a high impedance mode during a receiving operation.

13. The circuit of claim 9, wherein the filter network includes a band-pass filter.

14. The circuit of claim 9, further comprising a plurality of high-voltage switches, each of the plurality of high-voltage switches coupled between the first transformer and a corresponding one of the plurality of line interface coupling circuits.

15. A circuit comprising:
a first amplifier;
a first capacitor coupled to the first amplifier;
a shared transformer coupled to the first capacitor;
a plurality of high-voltage switches, each of the plurality of high-voltage switches coupled to the shared transformer; and
a plurality of line interface coupling circuits, each of the plurality of line interface coupling circuits coupled to a corresponding one of the plurality of high-voltage switches, each of the plurality of line interface coupling circuits connectable to a different phase of an electrical power circuit, and each of the plurality of line interface coupling circuits including a high-pass filter.

16. The circuit of claim 15, wherein the plurality of high-voltage switches are configured such that, in response to an indication that the circuit is configured to operate in a transmitting mode, at least one of the plurality of high-voltage switches is open.

17. The circuit of claim 15, further comprising:
a plurality of capacitors, each of the plurality of capacitors coupled to a corresponding one of the plurality of line interface circuits;
a filter network coupled to the plurality of capacitors; and
a second amplifier coupled to the filter network.

18. The circuit of claim 17, wherein the plurality of high-voltage switches are configured such that, in response to an indication that the circuit is configured to operate in a receiving mode, only one of the plurality of high-voltage switches is closed.

19. The circuit of claim 17, wherein the filter network includes a band-pass filter.

20. The circuit of claim 19, wherein the band-pass filter is dynamically adjustable to select a frequency band corresponding to a frequency selected in response to an indication that the circuit is configured to operate in one of a plurality of different receiving modes.

* * * * *